United States Patent
Haefner et al.

(10) Patent No.: US 11,858,474 B2
(45) Date of Patent: Jan. 2, 2024

(54) WIND DEFLECTOR FOR A WINDOW WIPER SYSTEM OF A MOTOR VEHICLE

(71) Applicants: AUDI AG, Ingolstadt (DE); DR. ING. H.C.F. PORSCHE AG, Stuttgart (DE); A.RAYMOND ET CIE, Grenoble (FR); VOLKSWAGEN AG, Wolfsburg (DE)

(72) Inventors: Stephan Haefner, Prebitz (DE); Frank Ackermann, Koenigslutter am Elm (DE); Sven Auch, Stuttgart (DE); Axel Feger, Loerrach (DE); Karl Bode, Loerrach (DE)

(73) Assignees: Audi AG, Ingolstadt (DE); Dr. Ing. H.C.F. Porsche AG, Stuttgart (DE); A. Raymond Et Cie, Grenoble (FR); Volkswagen Aktiengesellschaft, Wolfsburg (DE)

( * ) Notice: Subject to any disclaimer, the term of this patent is extended or adjusted under 35 U.S.C. 154(b) by 78 days.

(21) Appl. No.: 17/604,472

(22) PCT Filed: Apr. 14, 2020

(86) PCT No.: PCT/EP2020/060417
§ 371 (c)(1),
(2) Date: Oct. 18, 2021

(87) PCT Pub. No.: WO2020/212321
PCT Pub. Date: Oct. 22, 2020

(65) Prior Publication Data
US 2022/0410844 A1 Dec. 29, 2022

(30) Foreign Application Priority Data
Apr. 16, 2019 (DE) .......................... 102019110079.8

(51) Int. Cl.
*B60S 1/38* (2006.01)
*B60S 1/34* (2006.01)
*B60S 1/52* (2006.01)

(52) U.S. Cl.
CPC ........... *B60S 1/3806* (2013.01); *B60S 1/3415* (2013.01); *B60S 1/522* (2013.01)

(58) Field of Classification Search
CPC .............................. B60S 1/522; B60S 1/3415
See application file for complete search history.

(56) References Cited

U.S. PATENT DOCUMENTS 4,782,547 A * 11/1988 Mohnach .............. B60S 1/0408
15/250.04

FOREIGN PATENT DOCUMENTS

DE 8716154 U1 1/1988
DE 19914122 A1 9/2000
(Continued)

*Primary Examiner* — Andrew A Horton
(74) *Attorney, Agent, or Firm* — Laurence A. Greenberg; Werner H. Stemer; Ralph E. Locher

(57) ABSTRACT

A wind deflector for a windscreen wiper system of a motor vehicle has a windscreen-cleaning apparatus with at least one nozzle for cleaning a windscreen integrated therein. The wind deflector has a wind deflector contour, by way of which an air flow in the region of an associated wiper arm and a wiper blade can be guided. The wind deflector, on its side that faces the wiper blade, has at least one wind-guiding element, which is arranged in the region of the associated nozzle and protrudes, raised, toward the windscreen.

8 Claims, 9 Drawing Sheets

(56) References Cited

FOREIGN PATENT DOCUMENTS

| DE | 102012211083 | A1 | 1/2014 |
|----|--------------|----|--------|
| FR | 2642715 | A1 | 8/1990 |
| WO | 2009127583 | A1 | 10/2009 |

* cited by examiner

WIND DEFLECTOR FOR A WINDOW WIPER SYSTEM OF A MOTOR VEHICLE

FIELD AND BACKGROUND OF THE INVENTION

The invention relates to a wind deflector for a windscreen wiper system of a motor vehicle in which a windscreen cleaning device with at least one nozzle for cleaning a windscreen is integrated, and which includes a wind deflector contour, by means of which an air flow can be guided in the area of an associated wiper arm and a wiper blade.

From DE 87 16 154 U1, an add-on device for a windscreen wiper is already known, which has a wind deflecting function. The add-on device is manufactured from a plastic in an extrusion molding method and includes a receptacle for attachment of a wiper rod of a wiper arm of the windscreen wiper system. In addition, the add-on device includes a receptacle for a hose of a windscreen washer system with at least one nozzle for cleaning a windscreen, which can be wiped by the windscreen wiper system.

SUMMARY OF THE INVENTION

It is the object of the present invention to provide a wind deflector of the initially mentioned type, in which the wind deflector or the entire wiper arm with the wiper blade is particularly reliably and securely retained on the windscreen over all driving speeds and in which the cleaning liquid of the windscreen washer system particularly reliably gets to the windscreen and into the area of the wiper blade, respectively, on the other hand.

According to the invention, this object is solved by a wind deflector having the features as claimed. Advantageous configurations of the invention are the subject matter of the dependent claims.

The wind deflector according to the invention is first characterized in that a windscreen cleaning device with at least one nozzle for cleaning the windscreen is integrated in it, which can be wiped by means of a wiper blade arranged on a wiper arm. Moreover, the wind deflector includes a wind deflecting contour, by means of which an air flow can be guided in the area of the associated wiper arm and the associated wiper blade.

In order to herein provide an aerodynamically particularly beneficial wind deflector on the one hand, which retrains the wiper arm and the wiper blade on the corresponding windscreen in reliable manner over all driving speeds, and which ensures on the other hand that the cleaning liquid exiting the respective nozzle gets to the surface of the windscreen, it is provided according to the invention that the wind deflector includes at least one wind guiding element, in particular in the form of a protrusion, on its side facing the wiper blade, which is arranged in the area of the associated nozzle and protrudes raised towards the windscreen. Therein, a plurality of respective wind guiding elements or protrusions is preferably arranged on the side of the wind deflector facing the wiper blade and the windscreen, respectively, which are arranged at a respective distance to each other. Therein, the configuration of the respective wind guiding elements or protrusions only over a respective length area of the wind guiding element, wherein an interruption to the adjacent wind guiding element is provided, allows a beneficial aerodynamic influence of the wiper arm and the wiper blade on the one hand such that it is reliably pressed against the windscreen over all driving speeds, wherein a kind of slipstream is provided by the respective wind guiding element on the other hand, in which the nozzle can be arranged, and the free path to the windscreen is reduced such that cleaning liquid exiting the nozzle does not excessively swirl and thereby for example does not get to the surface of the windscreen, but that rather exactly the contrary is achieved, namely that the cleaning liquid gets to the surface of the windscreen in a relatively little deflected jet. By the selection of respective, relatively narrow wind guiding elements, thus, in contrast to for example a continuous, ledge- or lip-like wind guiding element, it is achieved that an excessive nozzle effect does not occur, which excessively deflects and swirls the respective jet of cleaning liquid exiting the nozzle, but that the jet rather impinges on the surface of the windscreen. On the other hand, a sufficient aerodynamic influence is nevertheless achieved—also by the interruption between the respective wind guiding elements or protrusions—such that the wiper arm and the wiper blade are reliably pressed against the windscreen.

In further configuration of the invention, therein, it has proven advantageous if the nozzle is integrated in the respectively associated wind guiding element or the associated protrusion. Hereby, a jet of cleaning liquid exiting the nozzle arises, which particularly beneficially gets to the windscreen.

In this context, it has proven further advantageous if a protective channel enlarged in cross-section with respect to the nozzle is integrated in the respective wind guiding element or the respective protrusion. Thus, the nozzle can be arranged in hidden manner such that the jet of cleaning liquid exiting it can exit through the protective channel in unimpeded manner and get towards the surface of the windscreen.

A further advantageous embodiment of the invention provides that the nozzle or the protective channel opens on a front side of the wind guiding element or the protrusion facing the windscreen. Accordingly, it is provided according to the invention that the jet of cleaning liquid exits on the facing front side towards the windscreen. Thus, an extremely short distance between the front side of the wind guiding element or protrusion and the surface of the windscreen results, which has to be overcome by the jet of cleaning liquid.

An embodiment alternative to the configuration as claimed provides that the nozzle is arranged behind the associated wind guiding element or protrusion in the slipstream thereof in the direction of the air flow. By the arrangement of the nozzle, protected from the air flow, behind the wind guiding element or protrusion, thus, a spreading of the jet of cleaning liquid mostly without deflection towards the surface of the windscreen also arises.

In this context, it has proven further advantageous if the wind guiding element or the protrusion has an arcuate contour in cross-section on its side facing the nozzle. Hereby, a deflection of the jet of cleaning liquid as a result of an air flow is again reduced in improved manner.

A further advantageous embodiment of the invention provides that the wind guiding element or the protrusion is formed of an elastic plastic component of the wind deflector. Thus, a particularly beneficial surface of the wind deflector arises, which for example avoids damages of the windscreen.

In further configuration of the invention, a trailing edge is provided on a top side of the wind deflector, wherein this trailing edge preferably has a radius of less than 2 mm. Hereby, an aerodynamically particularly beneficial wind deflector arises, which also ensures that the wiper arm and the wiper blade are reliably pressed against the windscreen over all driving speeds among other things.

A further advantageous embodiment of the invention provides that the nozzle is integrated in a hard plastic component of the wind deflector. Hereby, a particularly strong and accurately oriented jet of cleaning liquid can be generated.

Finally, it has proven advantageous if a plurality of wind guiding elements is arranged in a row. Thus—as already described above—an excessive nozzle effect on the bottom side of the wind deflector is avoided and a sufficient supply of the surface of the windscreen with cleaning liquid is ensured at the same time.

BRIEF DESCRIPTION OF THE FIGURES

In the following, embodiments of the invention are described. Hereto, there shows:

FIG. 1a-1c respective perspective representations of a mounting sequence of a functional element, which is formed as a wind deflector and includes a windscreen cleaning device, on a wiper rod of a wiper arm of a windscreen wiper system for a motor vehicle according to a first embodiment, wherein FIG. 1a shows the functional element still separate from the wiper rod, FIG. 1b shows the functional element in partially fitted position on the wiper rod, and FIG. 1c illustrates the functional element completely fitted onto the wiper rod;

FIG. 2a-2c respective partial perspective representations of the functional element of the first embodiment of the windscreen wiper system, wherein FIG. 2a shows the functional element before fitting onto the wiper rod, FIG. 2b shows the functional element in completely fitted position, but not yet secured by means of an attachment device, and FIG. 2c illustrates the functional element subsequently fixed to the wiper rod by means of the attachment device;

FIG. 4a, 4b respective perspective views to a functional element attached to the corresponding wiper rod according to a further embodiment, in which the functional element is formed shorter and accordingly does not extend up to the spring case of the wiper arm, wherein FIG. 4a shows the functional element with an opened attachment device and FIG. 4b with a closed attachment device;

FIG. 5a, 5b respective perspective views of the wiper arm with the functional element mounted thereon according to FIGS. 4a and 4b, wherein FIG. 5a shows a wiper blade before its mounting and FIG. 5b shows the wiper blade after mounting by means of an adapter, which is arranged on and fixed to the free end of the wiper rod of the wiper arm independently of the functional element.

FIG. 6a, 6b respective perspective views to a functional element attached to the corresponding wiper rod according to a further embodiment, in which the functional element is formed of two parts, which are connected to each other at a film hinge or the like and can be connected to each other and attached to the wiper rod, respectively, by folding, wherein FIG. 6a shows the functional element before fixing to the wiper rod and FIG. 6b shows the functional element after fixing to the wiper rod;

FIG. 8a-8c respective sectional views through the functional element according to FIGS. 6a to 7, wherein FIG. 8a shows the two parts of the functional element in opened state analogously to FIG. 6a, FIG. 8b shows the functional element with the two parts in position arranged on the wiper rod, but not yet closed, and FIG. 8c illustrates the two parts of the functional element after attachment to the wiper rod;

DETAILED DESCRIPTION OF THE INVENTION

Figure 1A:
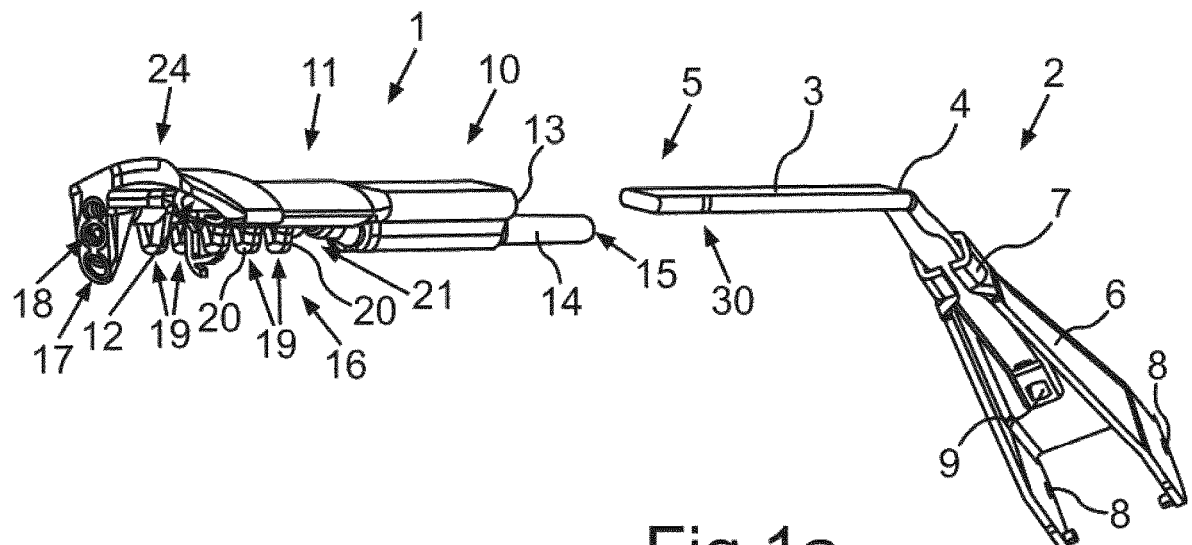

The embodiments explained in the following are preferred embodiments of the invention. In the embodiments, the described components of the embodiments each represent individual features of the invention to be considered independently of each other, which also each develop the invention independently of each other. Therefore, the disclosure also is to encompass combinations of the features of the embodiments other than the illustrated ones. Furthermore, the described embodiments can also be supplemented by further ones of the already described features of the invention.

In the figures, identical reference characters each denote functionally identical elements.

Figure 1B:
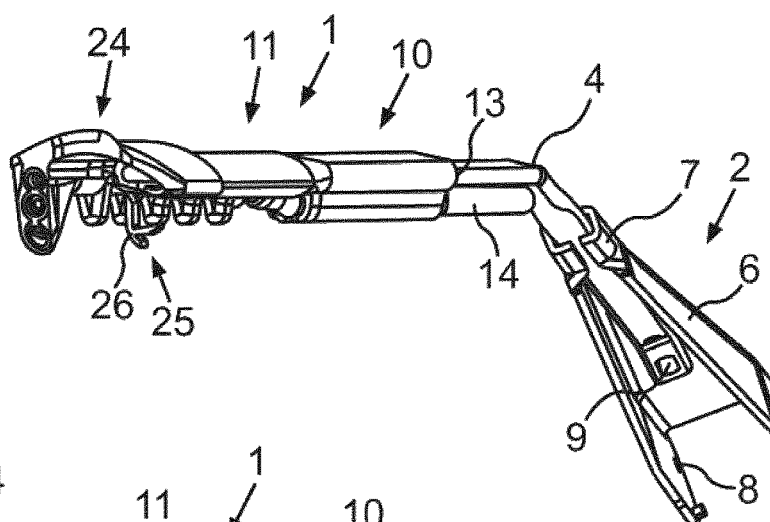
Figure 1C:
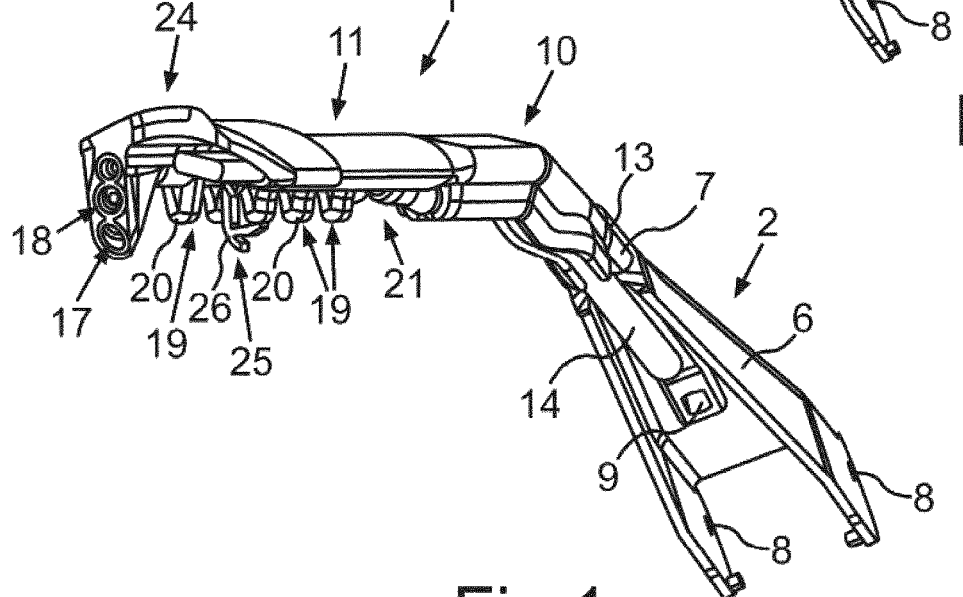

FIGS. 1a, 1b and 1c show a mounting sequence for arranging and fixing a functional element 1, explained in more detail below, to a wiper arm 2 in a respective perspective view. Herein, the wiper arm 2 and the functional element 1 are first illustrated separated in exploded manner in FIG. 1a.

Herein, it is in particular apparent that the wiper arm 2 includes a wiper rod 3, which is angularly formed in a bend area 4. The wiper rod 3 is fixedly connected to a spring case 6 on a side opposite to a free end 5, which is at least substantially rectangularly formed in cross-section in a connection area 7 and crimped onto the wiper rod 3 also at least substantially rectangular in cross-section. The spring case 6 is connected to a lever element, not illustrated, of the windscreen wiper system in articulated manner via bearing openings 8, which is occasionally also referred to as attachment part, which in turn is rotationally fixedly connected to an associated drive shaft of a drive motor. The wiper arm 2 is pivotable around the axis formed by the bearing pins 8 with respect to the associated lever element against the spring force of a spring element, which in turn can be hooked in a spring receptacle 9 at the corresponding end of the wiper rod 3, for example to press the wiper arm 2 and an associated wiper blade, respectively, against the surface of a front windscreen in the operating position.

The functional element 1 comprises a first partial area 10 and a second partial area 11 formed integrally with it, within which a continuous receiving channel 12 for the wiper rod 3 is provided. Therein, the receiving channel 12 is at least substantially adapted in cross-section to the approximately rectangular cross-section of the wiper rod 3, which has an at least substantially uniform cross-section over its entire extension. Accordingly, the receiving channel 12 also has a substantially uniform cross-section over its entire length within the functional element 1.

As is further apparent in synopsis with the FIGS. 1*b* and 1 *c*, the functional element 1 can accordingly be fitted or shifted onto the wiper rod 3 from the free end 5 until an end 13 of the first partial area 10 of the functional element 1 joins to the connection area 7 of the spring case 6 in at least substantially flush manner. In order that fitting of the functional element 1 onto the wiper rod 3 up to the spring case 6 can be effected, the functional element 1 is manufactured of an elastic material, for example a corresponding plastic, in the first partial area 10—starting from the end 13—at least over the bend area 4. By this soft-elastic material, it is optionally also conceivable that the connection area 7 of the spring case 6 is surmounted by the end 13 of the partial area 10 of the functional element 1 in sleeve-like manner.

In addition, the end 13 of the partial area 10 is surmounted by a conduit part 14, via which the functional element 1 can be supplied with a windscreen cleaning liquid in a manner described in more detail below. Accordingly, at least one supply channel 15 for windscreen cleaning liquid is formed within the conduit part 14, via which the functional element 1 can be supplied with windscreen cleaning liquid in a manner described in more detail below. This supply channel 15 further extends also over the partial area 10 as well as over the partial area 11 of the functional element 1. Accordingly, a windscreen cleaning device 16 or a part of it is formed in the functional element 1 such that the wiper arm 2 is a so-called wet wiper arm in the present case. This means that the windscreen to be cleaned by means of the windscreen wiper system, in particular the front windscreen of the motor vehicle, can be supplied with windscreen cleaning liquid via nozzles, which are carried by the wiper arm 2. Therein, the end of the conduit part 14 of the functional element 1 is connected to the windscreen cleaning system for windscreen cleaning liquid along with associated pump via a channel arrangement not further shown. Usually, it is accommodated in the front space or engine compartment of the motor vehicle. As is in particular apparent from FIG. 1*c*, the conduit part 14 extends on the bottom side of the wiper rod 3 further up to the interior of the spring case 6 in the present case.

In synopsis of the FIGS. 1*a* to 1 *c*, it is furthermore apparent that shifting the functional element 1 onto the wiper rod 3 is effected until it—as is apparent from FIG. 1*c* in the finally mounted position of the functional element 1—protrudes from the receiving channel 12 over a substantial length area at a free end 5. Inversely, this means that the functional element 1 with the partial areas 10, 11 is connected to a length area of the wiper rod 3 spaced from the free end 5 of the wiper rod 3 via the receiving channel 12.

In other words, the free end 5 protrudes beyond the partial area 11 of the functional element 1 and from the receiving channel 12, respectively.

The windscreen cleaning device 16 integrated in the functional element 1 presently includes a channel system with respective channels integrated in the functional element 1, which open into diverse nozzles, via which the windscreen to be cleaned and to be wiped, respectively, and the wiper blade explained in more detail below, respectively, can be supplied with windscreen cleaning liquid.

Thus, the windscreen cleaning device 16 first includes two outer circle nozzles 17, 18, via which the wiper blade is supplied in the near area of its outer circle, thus that area, in which the wiper blade traverses the largest radius of its surface to be wiped. Therein, the outer circle nozzle 17 covers an area closer to the functional element 1 and the outer circle nozzle 18 covers an area further away from the functional element 1 near the outer circle of the corresponding wiper blade.

In addition, the windscreen cleaning device 16 includes a plurality of presently five central nozzles 19, which all extend at least substantially in a row along the extension direction of the functional element 1. The respective nozzles 19 are accommodated in respectively associated protrusions 20 protruding from the functional element 1 and from the wiper arm 2, respectively, towards the windscreen to be wiped and to be cleaned in a manner described below. Finally, the windscreen cleaning device 16 includes at least one inner circle nozzle 21, via which the wiper blade of the wiper arm 2 is supplied with cleaning liquid in the area of its inner circle, in which the wiper blade traverses its shortest radius of the corresponding wiping surface in the wiping operation. Therein, all of the nozzles 17, 18, 19 and 21 can be adjusted such that they apply the cleaning liquid to the windscreen, in particular the front windscreen, at a corresponding distance in front of the wiper blade moving thereto upon a start movement, thus upon an upwards movement of the respective wiper arm 2 in case of a front windscreen. Optionally, the wiper blade can also be immediately supplied with the windscreen cleaning liquid.

Besides the integration of the windscreen cleaning device 16, the functional element 1 includes the further function of wind deflection. Accordingly, the functional element 1 is formed as a wind deflector 22 in the present case and includes a wind deflecting contour 23 on the front and top side, respectively, at least substantially facing away from the nozzles 19 as well as the wiper rod 3 to accordingly allow a particularly beneficial overflow of the air usually flowing to the respective wiper arm 2 and the corresponding wiper blade, respectively, from the front.

Thus, the present functional element 1 is formed as a wind deflector 22 and for integration of the windscreen cleaning device 16. However, it is to be considered as encompassed within the scope of the invention that the functional element 1 could also perform only one of these two functions.

Figure 2A:
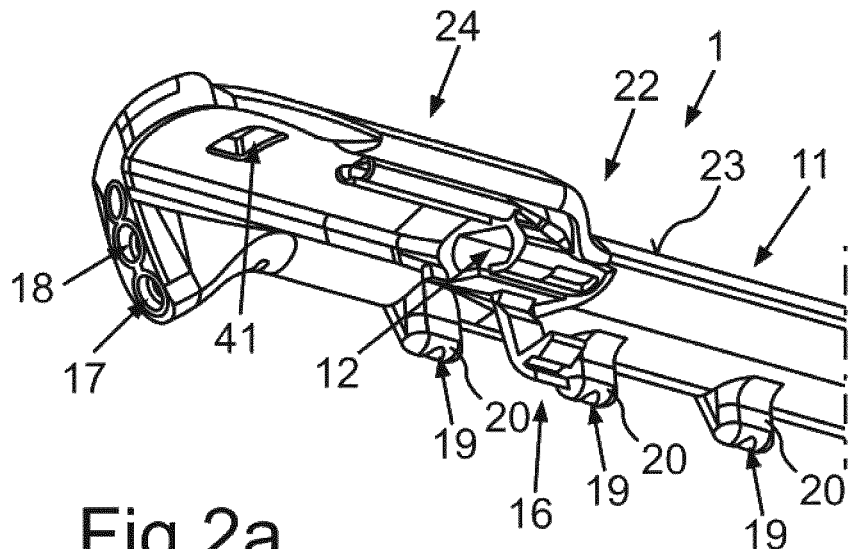
Figure 2B:
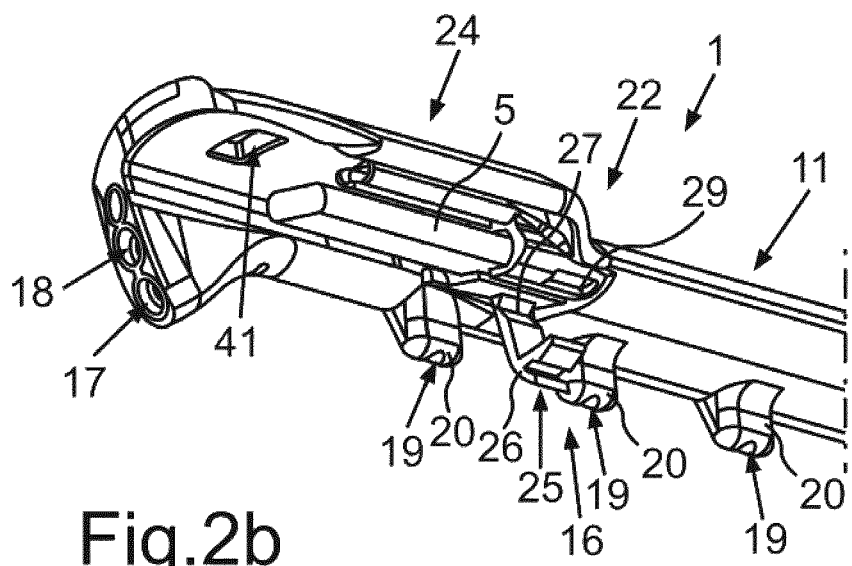
Figure 2C:
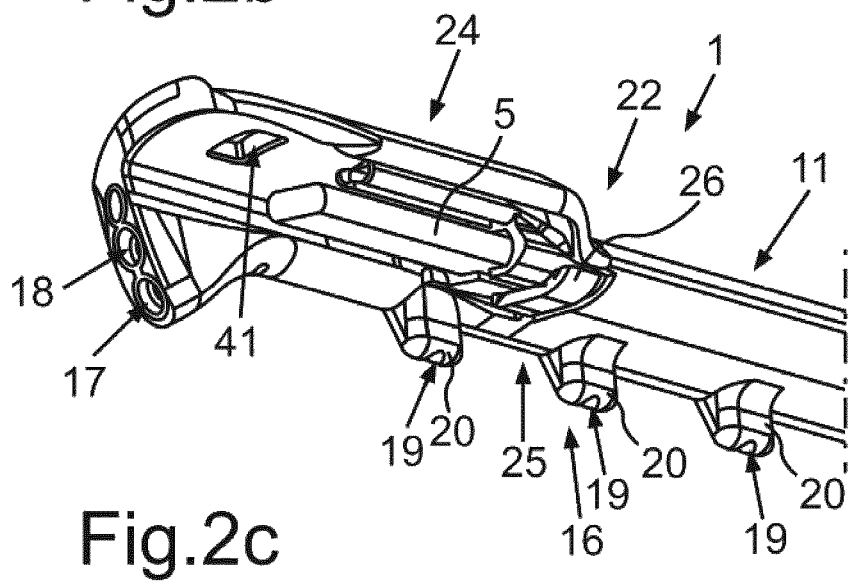

The FIGS. 2*a* to 2*c* show the functional element 1 of the embodiment described in the FIGS. 1*a* to 1*c* in respective partial and perspective bottom views. Therein, the receiving channel for the wiper rod 3 is in particular apparent from FIG. 2*a*, which from a third partial area 24 of the functional element 1, which is also formed integrally with the partial areas 10 and 11. Therein, the FIGS. 2*b* and 2*c* show the position of the functional element 1 when it is completely fitted onto the wiper rod 3. In this position, the third partial area 24 of the functional element 1 covers the free end 5 of the wiper rod 3, in particular at the front side thereof and on the bottom side thereof—related to the installation position of the wiper arm 2. Further, it is apparent that the wiper rod 3 is arranged recessed with respect to the partial area 24.

Based on a synopsis of the FIGS. 2a and 2b with that according to FIG. 2c, it is additionally apparent that the functional element 1 is arranged secured to the wiper rod 3 of the wiper arm 2 in extension direction of the receiving channel 12 by means of an attachment device 25 in the present case. In the present case, the securement is effected by means of a flap 26, which is pivotably arranged on the functional element 1 via a film hinge 27. If the flap 26 is inserted by means of a locking element 28 into a locking receptacle 29 provided hereto in the area of the receiving channel 12, thus, the locking element 28 also engages with a groove 30 (FIG. 1a) within the wiper rod 3. Hereby, an axial securement of the functional element 1 on the wiper rod virtually results such that the functional element 1 is correspondingly secured in position after shifting onto the wiper rod 3.

Figure 3A:
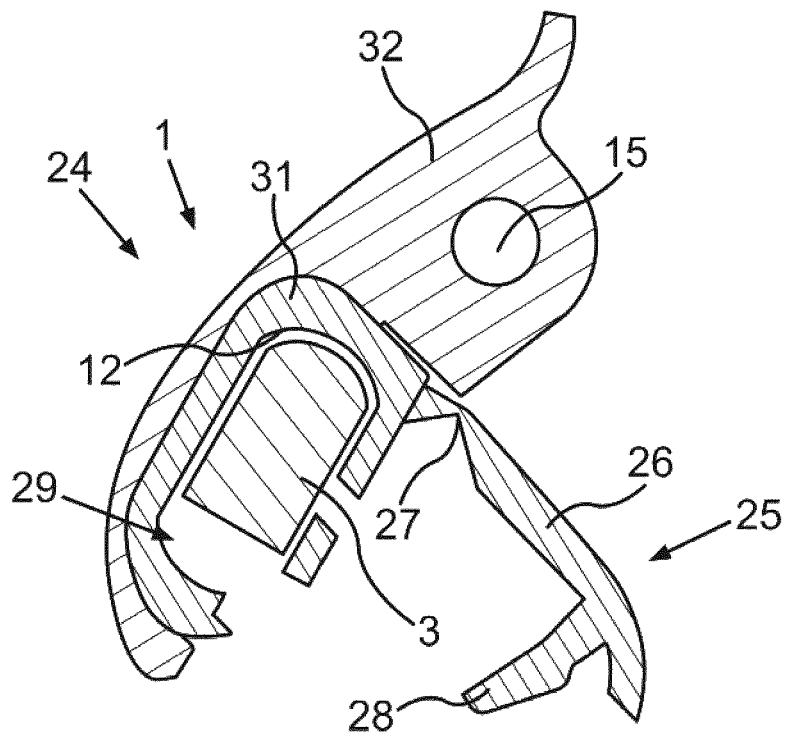
FIG. 3a, 3b respective sectional views through the functional element in its position arranged on the wiper rod, wherein in FIG. 3a the attachment device for fixing the functional element to the wiper rod is illustrated in opened state and in FIG. 3b the attachment device is illustrated in closed position fixing the functional element to the wiper rod.
Figure 3B:
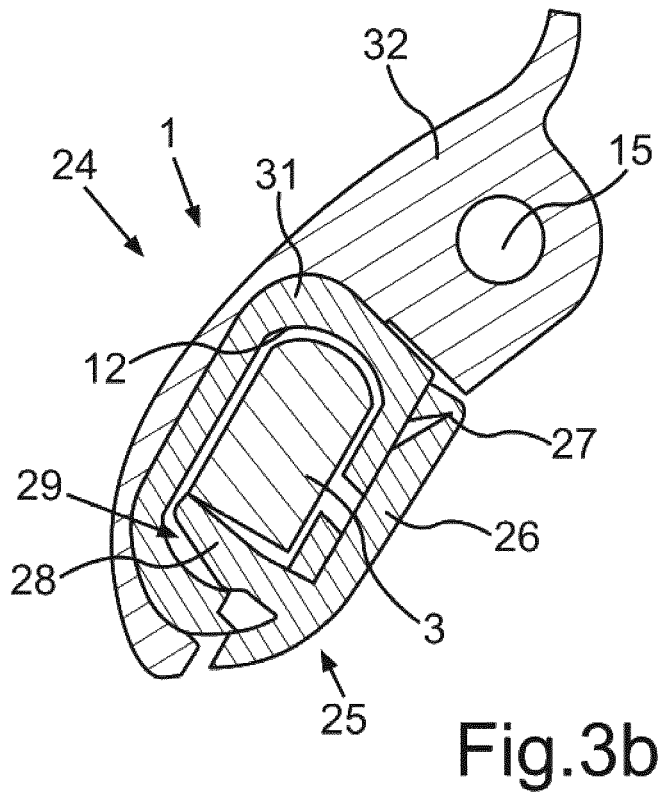

In the FIGS. 3a and 3b, the attachment device 25 is again explained in its functionality in a respective sectional view of the arrangement of the functional element 1 on the wiper rod 3. Herein, it is in particular apparent how the axial securement of the locking element 28 on the side of the flap 26 within the locking receptacle 29 or at the groove 30 of the wiper rod 3 results.

Based on the different hatchings, it additionally becomes clear from the FIGS. 3a and 3b that the functional element 1 is presently manufactured as a plastic part in a two-component method, for example a two-component injection molding method. Herein, it is in particular apparent that the receiving channel 12 is formed by a hard component 31 in the area of the attachment device 25. Similarly, the respective channels carrying the cleaning liquid in the second and third partial areas 11, 24 of the functional element 1 are formed of this hard component 31 at least in the area of the respective nozzles 17, 18, 19, 21. Therebetween, parts can also be formed by a soft component 32 of the plastic, which incidentally also form the first partial area 10 and the conduit part 14—as already explained. The wind deflector contour 23 of the functional element 1 is also formed by the soft component 32—as it is apparent from the FIGS. 3a and 3b. Therein, the components 31, 32 are in particular formed UV-resistant to be correspondingly permanently durable.

Figure 4A:
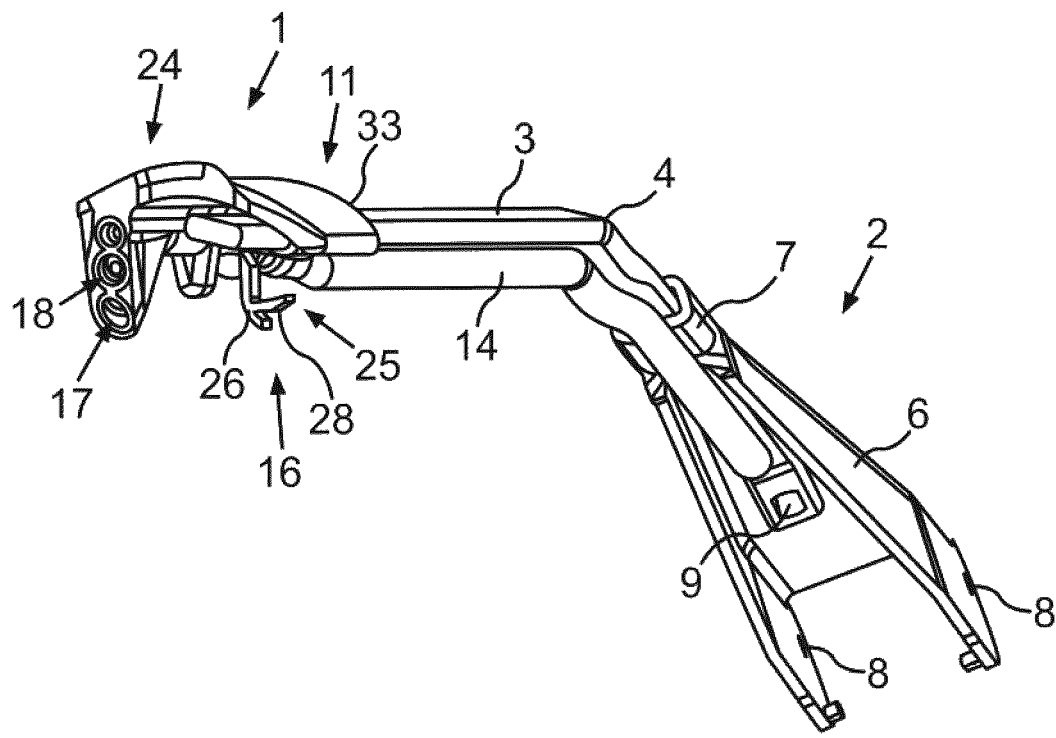
Figure 4B:
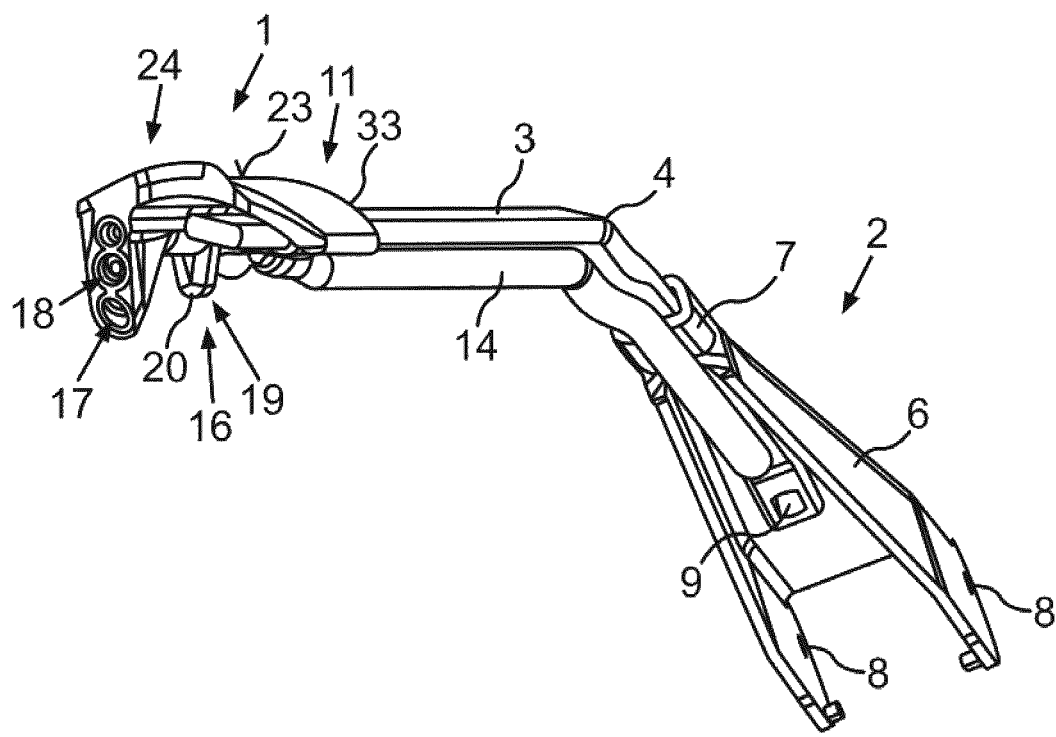

In the FIGS. 4a and 4b, an alternative embodiment of the functional element 1 is illustrated in a respective perspective view. This functional element 1 is substantially identical to that according to the first described embodiment in its configuration and function such that only the differences are to be addressed below. This functional element 1 substantially differs in that in it the first partial area 10 of the functional element 1, which extends between the second partial area 11 and the connection area 7 of the spring case 6, is not provided here. Rather, the functional element 1 terminates with an end 33 at a distance before the bend area 4 and accordingly at a substantial distance before the connection area 7 of the spring case 6. The conduit part 14 of the functional element 1 accordingly extends over a substantial length without additional sheathing of the wiper rod 3 below or inside it up into the spring case 6, from where the further connection for supply with the cleaning liquid is effected.

Depending on how shortly the functional element 1 is formed, one or multiple respective inner circle nozzles 21 can optionally be omitted in some embodiments. Such a configuration for example arises in vehicles of the compact class, in which a relatively low windscreen surface has to be wiped and cleaned, respectively. On a respective passenger's side of a larger windscreen too, such a concept optionally also offers itself. Incidentally, the windscreen cleaning device 16 integrated in the functional element 1 has a configuration at least substantially identical to the embodiment already described in context of the FIGS. 1a to 3b. However—according to length of the functional element 1 and in particular of the partial areas 11 and 24, respectively—a lower number of central nozzles 19 can be provided. In the present embodiment too, the locking element 28 is again apparent, by means of which the functional element 1 can be secured after fitting onto the wiper rod 3.

Figure 5A:
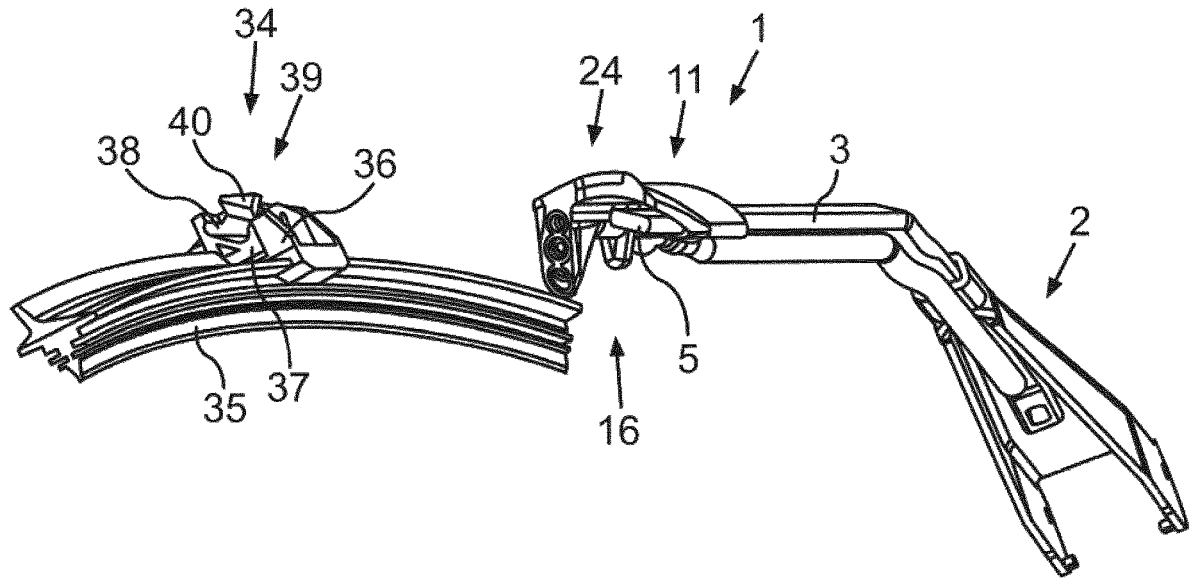
Figure 5B:
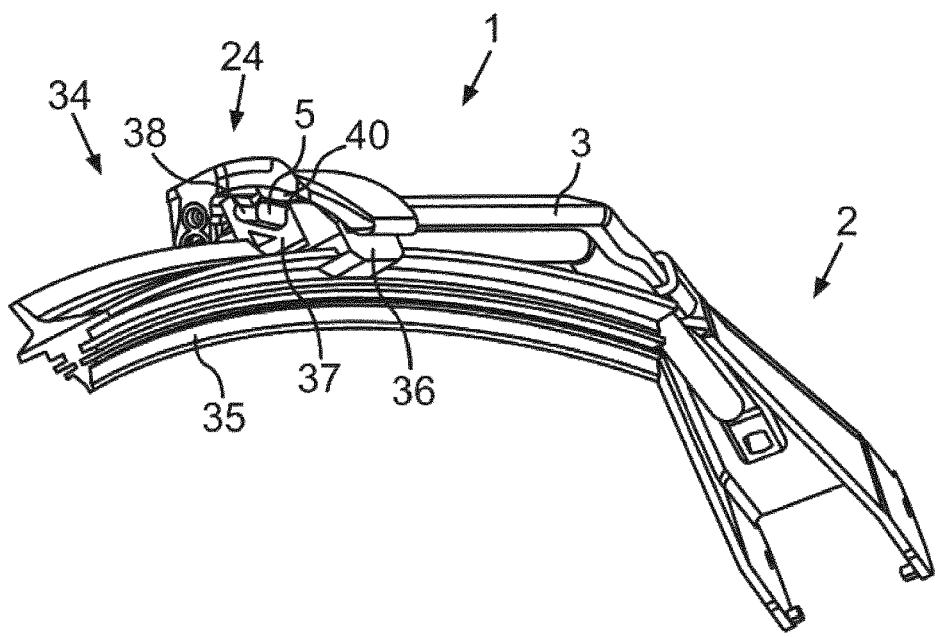

In the FIGS. 5a and 5b, mounting of a wiper blade 34 on the corresponding free end 5 of the wiper rod 3, which protrudes from the receiving channel 12 of the functional element 1, is finally illustrated in a respective perspective view. Therein, the wiper blade 34 includes a wiper blade element 35, to which a basic body in the form of a slider 36 is attached. This slider 36 is in turn connected to an adapter 37 in articulated manner such that the wiper blade element 35 with the slider 36 can be pivoted relatively to the adapter 37 to a certain extent. The adapter 37 includes a receptacle 38 formed at least partially open in the present case, via which the adapter 37 and thus the entire wiper blade 34, respectively, can be fitted at the free end 5 of the wiper rod 3. Hereto, the receptacle 38, which is formed as a type of plug-in receptacle, is adapted in its cross-section and in its shape, respectively, to the cross-section of the wiper rod 3. After the adapter 37 with the receptacle 38 is fitted onto the free end 5 of the wiper rod 3 over a certain length area, a locking device 39 engages, which includes a corresponding locking element both on the side of the adapter 37 and on the side of the wiper rod 3. This locking device 39 can for example include a locking pin or the like on the side of the adapter 37, which engages with a locking recess on the side of the free end 5 of the wiper rod 3. Therein, the locking device 39 is detachable by means of an actuating element 40 in the form of a push button or the like, which has to be pressed towards the wiper blade element 39 in the present case.

In its locked position, this actuating element 40 penetrates a passage opening 42 within the partial area 24 of the functional element 1. In the locked position of the locking device 39, thus, the actuating element 40 is at least substantially arranged within this passage opening 41 and accordingly can be actuated from the front outside to remove the wiper blade 34 from the free end 5 of the wiper rod 3.

Since the functional element 1 thus is attached to the wiper rod 3 in a length area of it spaced from the free end 5 and the adapter 37 of the wiper blade 34 is attached to the free end 5 of the wiper rod, a completely independent respective arrangement and fixing to the wiper rod 3 results for the functional element 1 and the wiper blade 34. This has the advantage that the wiper blade 34 can be removed and for example exchanged from time to time completely independently of the functional element 1 without this having an influence on the functionality of the functional element 1. Therein, it is in particular to be taken into account that both the wind deflecting function and the windscreen cleaning function of the functional element 1 is completely maintained even if the adapter 37 is removed, but the functional element 1 remains on the wiper rod 3. In contrast to other systems, thus, a part of the wind deflecting device or the windscreen cleaning device is not removed and for example disposed of with the exchange of the wiper blade 34, which creates corresponding financial problems and problems arising with respect to the sustainability. Rather, a system is thus provided, in which the connection of the wiper blade 34 and the connection of the functional element 1 as well as performing the functions accomplished by the functional element are completely autonomous from each other.

Moreover, further elements can be integrated in the functional element 1. In particular, a heating for the windscreen cleaning device can also be integrated. Here too, the advantages already described in context of the windscreen cleaning device arise.

Figure 6A:
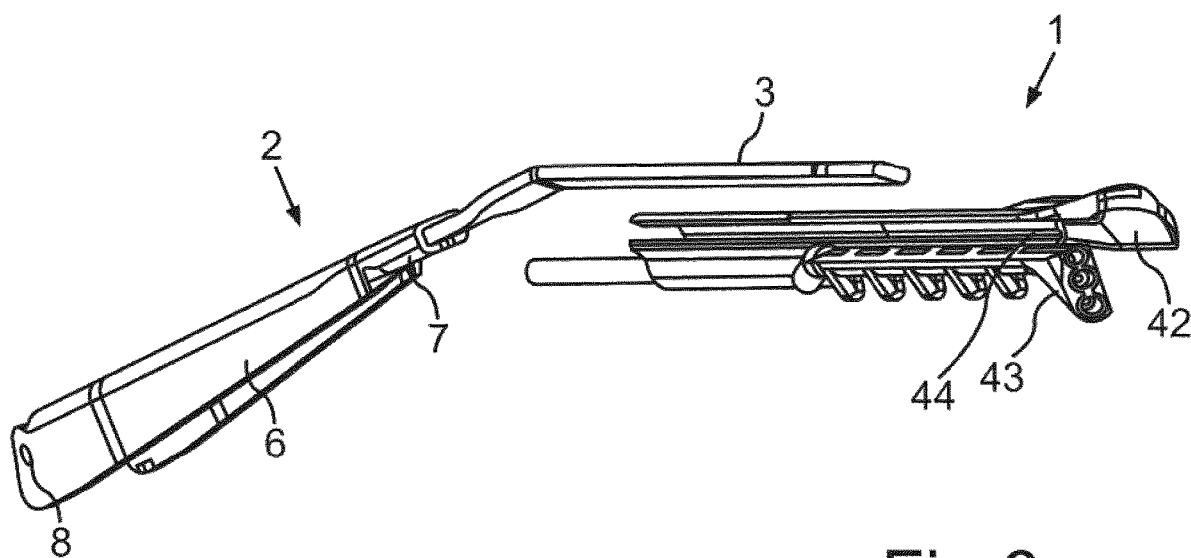
Figure 6B:
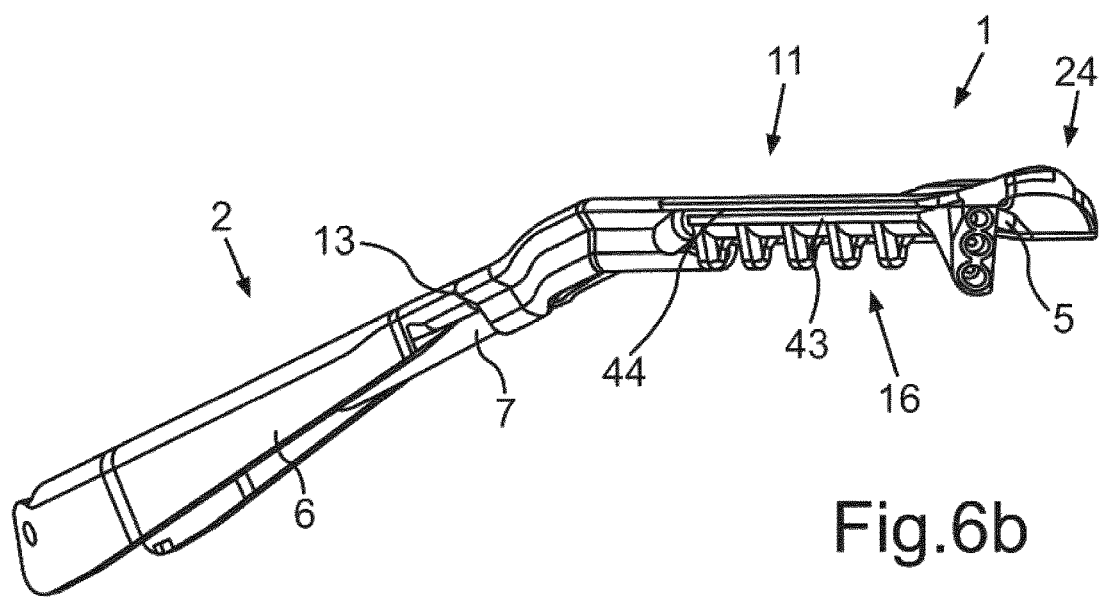

In the FIGS. 6a and 6b, a further, alternative embodiment of the functional element 1 is illustrated in a respective perspective view. This functional element 1 too is substantially identical to that according to the first described embodiment in its configuration and function such that only differences are to be addressed below. This functional element 1 substantially differs in that it is composed of two parts 42, 43, which are integrally connected to each other in the manner of a film hinge. Here, a completely two-part or multi-part variant would optionally also be conceivable.

Figure 8A:
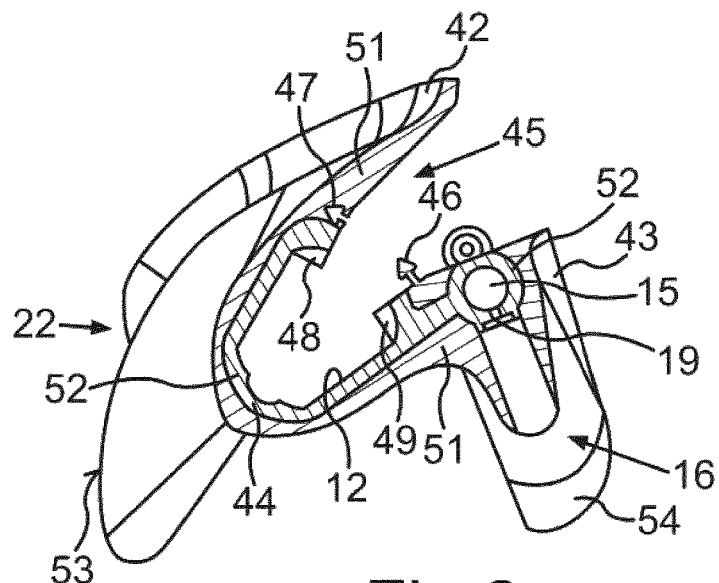
Figure 8B:
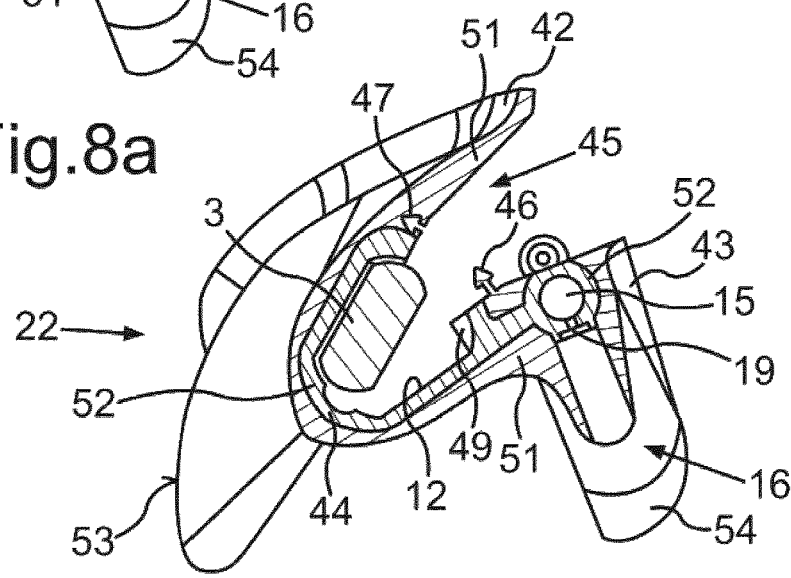
Figure 8C:
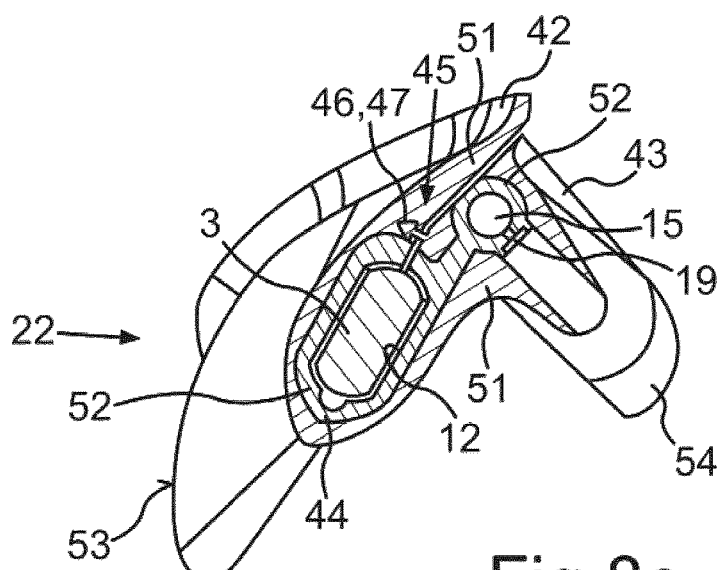

In synopsis with the FIGS. 8a to 8c, which show a respective cross-sectional view through the functional element 1 and the wiper rod 3, respectively, therein, it becomes apparent in which manner the arrangement and fixing of the two parts 42, 43 and of the functional element 1 overall, respectively, to the wiper rod 3 are effected. According to the FIGS. 6a and 8a, respectively, therein, the functional element 1 is shifted and/or fitted onto the wiper rod 3 with opened parts 42, 43 until the wiper rod 3—as it is in particular apparent from FIG. 8b— is arranged in its intended receiving channel 12, which is formed analogously to the receiving channels 12 according to the first two embodiments. In other words, the two parts 42, 43 of the functional element 1 or of the wind deflector 22 can be mounted on the wiper rod 3 of the wiper arm 2 in divided state.

Subsequently thereto, the two parts 42, 43 can then be pivoted against each other around the axis formed by the film hinge 44 or the like and joined together until the parts 42, 43 are connected to each other by means of the attachment device 45 on the side facing away from the film hinge 44 in the present case. Herein, the attachment device 45 includes one or more locking elements 46 at the one part 43, which—as it is in particular apparent from FIG. 8c— engage with each one or more corresponding locking elements in the form of locking receptacles 47. Thus, by joining the two parts 42, 43, the wind deflector 22 is fixed to the component 3 of the wiper arm 2 of the windscreen wiper system.

Figure 7:
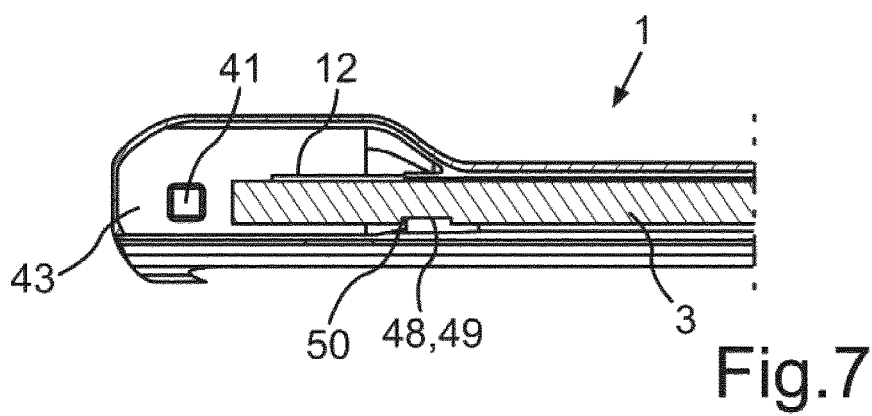
FIG. 7 a partial sectional view through the functional element as well as the associated wiper rod, to which the functional element is attached, along a sectional plane, which extends in a separating plane between the two parts of the functional element, wherein in particular an attachment device becomes apparent, by means of which the functional element is secured to the wiper rod.

In addition, a respective securing lug 48, 49 is arranged at both parts 42, 43, which—as it is apparent from FIG. 7—engage with a groove 50 in the wiper rod 3. The securing lugs 48, 49 thus act as an axial securement of the attachment device 45 in their cooperation with the groove 50 to avoid displacement of the functional element 1 in extension direction of the wiper rod 3.

In the present case, the respective locking elements and locking receptacles 46, 47, respectively, for connecting the two parts 42, 43 are formed in the elastic plastic component 51 of the wind deflector 22. The respective securing lugs 48, 49 for fixing the functional element 1 to the wiper rod 3 are formed in the hard plastic component 52 of the wind deflector 22.

The divided design of this functional element 1 with the parts 42 and 43 offers the advantage that the functional element 1 can be fixed to the wiper rod 3 in simple manner even if the wiper rod 3 for example has a non-rectilinear extension or a bend area 4. Therein, the functional element 1 can extend both up to the spring case 6 and to the connection area 7 thereof, respectively, and terminate at a distance to this connection area 7. Presently, the two parts 42, 43 extend beyond the bend area 4 of the wiper rod 3 up to the spring case 6.

In particular, it is additionally apparent from the FIGS. 8a to 8c that—as in the preceding embodiments—the functional element 1 is formed partially of an elastic plastic component 51 and partially of a hard plastic component 52. In the present case, the receptacle or the receiving channel 12 is formed of the hard plastic component 52 at least in the partial area 11, but for example also in the partial area 10, in the present case, to thus obtain a particularly fixed and secure arrangement of the functional element 1 on the wiper rod 3. In other words, the receptacle or the receiving channel 12 is divided by both parts 42, 43 of the wind deflector 22.

In addition, in the present case, all of the liquid-carrying components of the windscreen cleaning device 16, thus for example the supply channel 15 as well as the respective nozzles 17, 18, 19, 21, are again at least substantially formed of the hard plastic component 52. The components of the windscreen cleaning device 16 carrying the cleaning liquid are thus particularly dimensionally stably and tightly designed. However, the windscreen cleaning device 16 is therein—as it is in particular apparent from the FIGS. 8a to 8c— at least substantially completely integrated in the elastic plastic component 51.

In the present embodiment, the wiper cleaning device 16 is additionally integrated in only one of the two parts 42, 43 of the wind deflector 22. This in particular has advantages with respect to the tightness since components of the two parts 42, 43 carrying cleaning liquid do not have to be connected to each other.

In particular—related to the installation position of the functional element 1 or of the wind deflector 22—a surface 53 on its visible side is at least substantially completely formed by the elastic plastic component 51. Hereby, an optically particularly beneficial impression and moreover a functional element 1 arise, which is particularly well protected from strokes, impacts or the like. Therein, the elastic plastic component 51 is preferably formed of a UV-resistant material to be correspondingly persistent. In addition, the elastic plastic component 51 comprises protrusions 54, which for example serve as dampers to protect the functional element 1 or the wind deflector 22 as well as the surface of the windscreen to be cleaned.

Figure 9A:
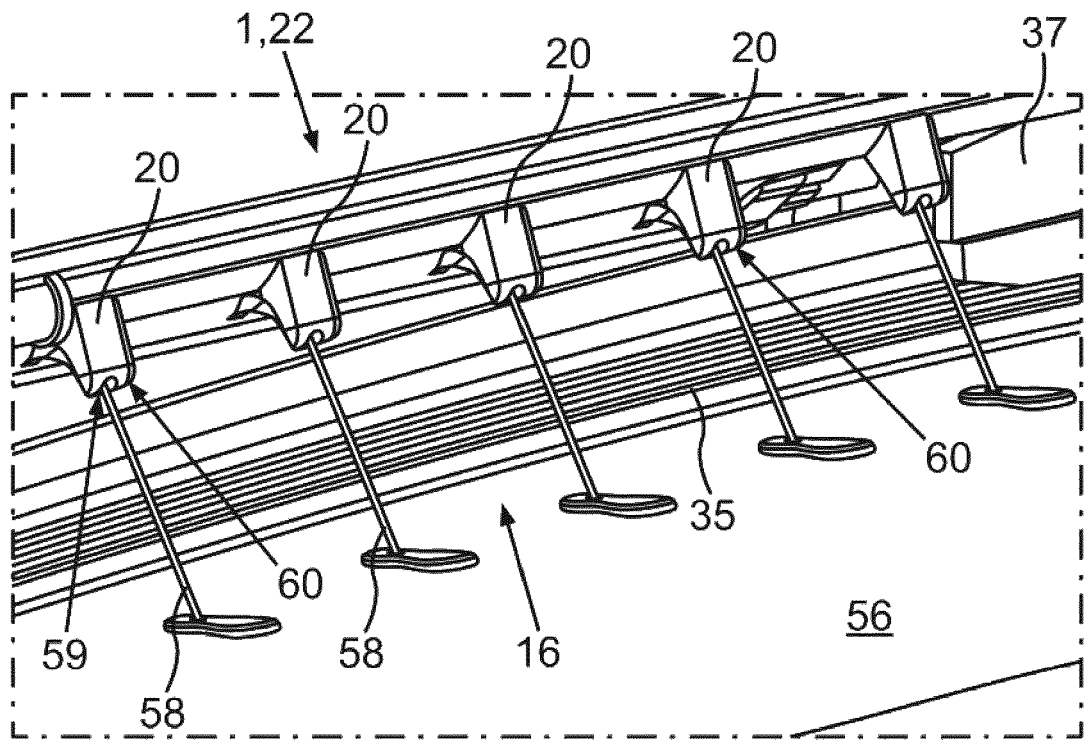
FIG. 9a, 9b a partial perspective view as well as a sectional view to a functional element according to the invention in the form of a wind deflector with the windscreen cleaning device integrated therein and a plurality of nozzles for cleaning the windscreens, wherein respectively associated protrusions are arranged on the side of the wind deflector facing the wiper blade and the windscreen, respectively, protruding raised towards the windscreen, wherein a jet of cleaning liquid exits towards the windscreen via a protective channel starting from the nozzle on a front side of the wind guiding element or protrusion facing the windscreen.

FIG. 9a shows in a partial perspective view the functional element 1 in the form of the wind deflector 22 as it can be employed in all of the embodiments described above. In synopsis with FIG. 9b, which shows a sectional view of the wind deflector 22 as well as of the wiper blade element 35 of the wiper blade 34, therein, it in particular becomes apparent that respective wind guiding elements in the form of the protrusions 20 are provided in a linear row related to an extension direction of the wind deflector 22 on the side thereof arranged to the wiper blade 34 and windscreen 56 to be cleaned and to be wiped, respectively. Therein, the respective protrusions 20 do not necessarily have to be arranged in a linear row, but can of course also be arranged in a row in another shape. Similarly, it is of course principally also conceivable to provide only one protrusion 20.

Figure 9B:
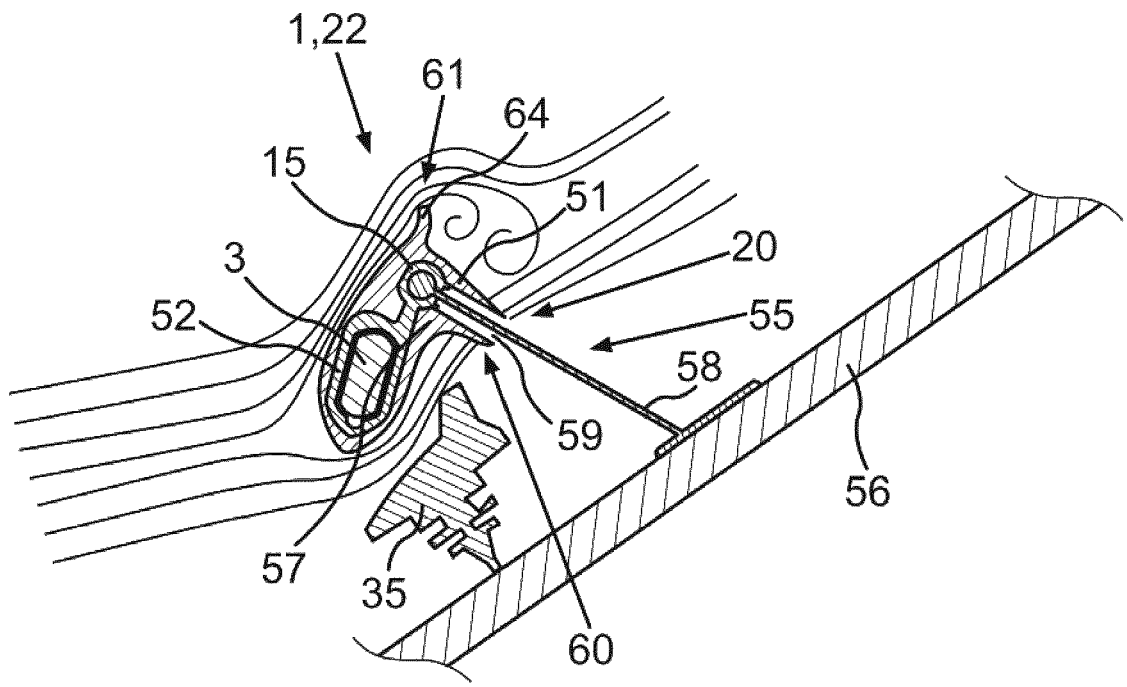

Now, as is in particular apparent in synopsis of the FIGS. 9a and 9b, one of the protrusions 20 is respectively arranged in the area of a respective nozzle 19. More precisely, one of the nozzles 19 is respectively integrated in the associated protrusion 20 or arranged in a foot area 57 of the respective protrusion in the present embodiment. As has already been explained, the respective nozzle 19 is therein integrated in the area of the corresponding, hard plastic components 52 of the wind deflector. Therein, a protective channel 59 joins to the respective nozzle—in exit direction of a jet 58 of cleaning liquid—which is enlarged in cross-section with respect to the nozzle or the nozzle exit and thus also with respect to the cross-section of the jet 58. Accordingly, the protective channel 59 is not to deflect the jet 58 of cleaning liquid, but rather protect it from an air flow 60, which passes through on the bottom side of the wind deflector 22 and on the top side of the wiper blade 35, respectively. Therein, the protective channel 59 exits on a front side 60 of the protrusion 20 facing the windscreen 56 and opens there, respectively. In an alternative embodiment, it would optionally also be conceivable to directly position the nozzle 19 in the area of this front side 60, thus, to optionally omit the protective channel 59. However, the protective channel 59 ensures that the jet 58 of cleaning liquid gets towards the surface of the windscreen 56 in clean and direct manner.

Moreover, the air flow 61 is illustrated in FIG. 9b, which correspondingly passes above and below the wind deflector 22, respectively, by means of the wind deflector contour 23 of the wind deflector 22.

Therein, the wind deflector contour 23 includes a trailing edge 64 on a top side 61 of the wind deflector 22, which has a radius of preferably less than 2 mm. Hereby, a particularly beneficial overflow of the wind deflector 22 and of the entire wiper arm 2 with the wiper blade 34, respectively, on the one hand, and a particularly beneficial positioning and retainment of the wiper arm 2 and of the wiper blade 34 on the surface of the windscreen 56 over all driving speeds at the same time are achieved.

Figure 10A:
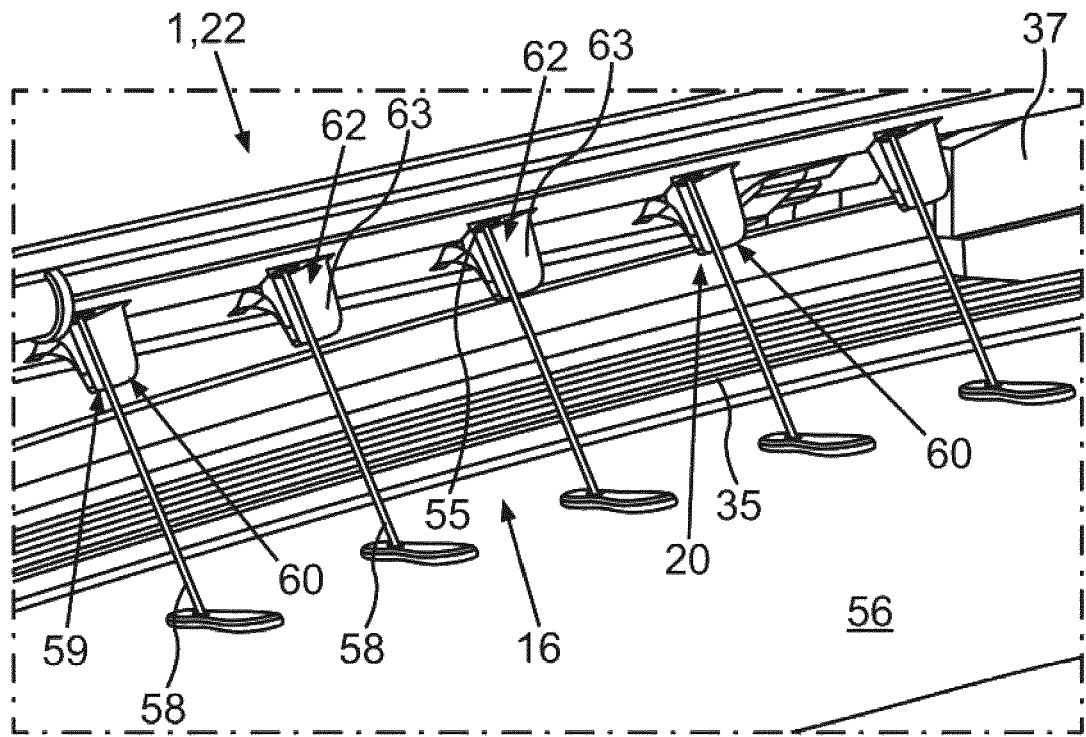
FIG. 10a, 10ba further perspective view as well as a sectional view through a wind deflector according to an alternative embodiment, in which the respective nozzles are arranged behind the associated wind guiding elements or protrusions in the direction of the air flow, whereby a respective jet of cleaning liquid gets towards the windscreen in the slipstream of the respective protrusion.
Figure 10B:
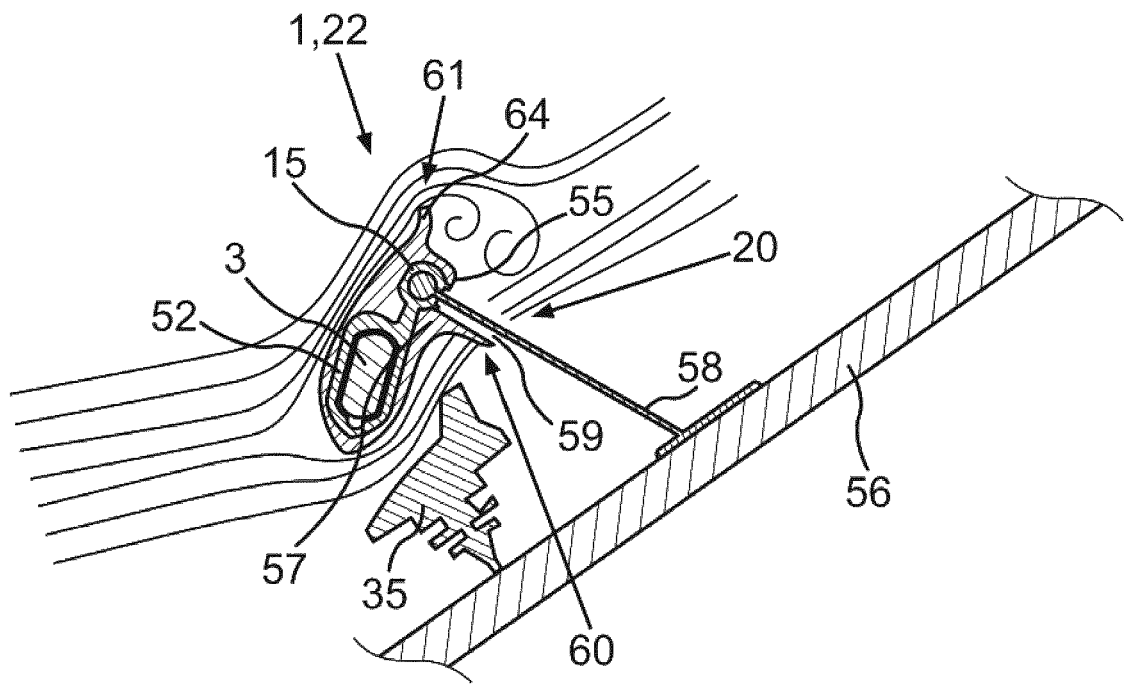

The FIGS. 10a and 10b show an alternative embodiment of the respective wind guiding elements or protrusions 20 in a respectively analogous perspective view and sectional view, respectively. They are characterized in that they are arranged behind the respectively associated wind guiding element or protrusion 20 in the direction of the air flow and open on the respective bottom side 55. In other words, the nozzles 19 are at least substantially on the bottom side 55 or in the near area of this bottom side 55 of the wind deflector 22 in the present case. In addition, it is apparent that the respective protrusions have an arcuate contour 63 in cross-section on the side 62 respectively facing the nozzle 19, which surrounds the jet 58 of cleaning liquid respectively exiting the nozzle 19 at a corresponding distance on the front side. In the present case, it is thus achieved by the respective protrusion 20 that the jet 58 of cleaning liquid can each exit the nozzle 19 and the bottom side 55 of the wind deflector 22, respectively, towards the windscreen 56 in the slipstream of the associated protrusion 20. By the arrangement of the nozzles 19, protected from the respective air flow, behind the respective protrusions 20, thus, a uniform and reliable wetting of the surface of the windscreen 56 with cleaning liquid is ensured in the present case too.

In the present case too, the protrusions 20 are formed of the soft plastic component 51, whereas the nozzles are again formed by the hard plastic component.

Thus, it is overall apparent that a wind deflector 22 with a row of respective wind guiding elements in the form of protrusions 20 is provided in the present case, which are arranged at a respective distance to each other, such that a particularly beneficial air flow without excessive nozzle effect aerodynamically appears behind the protrusions 20 on the one hand, such that a jet 58 respectively exiting the respective nozzles 19 in the area of the protrusions 20 directly and uniformly gets to the surface of the windscreen 56 to be wetted on the other hand.

The invention claimed is:

1. A wind deflector assembly for a windscreen wiper system of a motor vehicle, the wiper system including a wiper arm and a wiper blade, the wind deflector assembly comprising:
a wind deflector having a wind deflector contour for guiding an air flow at the wiper arm and the wiper blade;
a windscreen cleaning device with at least one nozzle for cleaning a windscreen integrated in said wind deflector;
said wind deflector including at least one wind guiding element on a side facing the wiper blade, said wind guiding element being a protrusion projecting raised towards the windscreen;
said nozzle being integrated in said wind guiding element and said wind guiding element being formed with a protective channel having an enlarged cross-section relative to said nozzle; and
said nozzle and said protective channel being open on a front side of said wind guiding element facing towards the windscreen and wherein a jet of cleaning liquid issuing from said nozzle traverses said protective channel in a direction towards the windscreen.

2. The wind deflector according to claim 1, wherein said nozzle is arranged behind the associated said wind guiding element in a direction of the air flow.

3. The wind deflector according to claim 2, wherein said wind guiding element has an arcuate contour in cross-section on a side thereof facing said nozzle.

4. The wind deflector according to claim 1, wherein said wind guiding element is formed of an elastic plastic component.

5. The wind deflector according to claim 1, wherein a top side of said wind deflector is formed with a trailing edge and said trailing edge has a radius of less than 2 mm.

6. The wind deflector according to claim 1, wherein said nozzle is integrated in a hard plastic component of said wind deflector.

7. The wind deflector according to claim 1, wherein said wind guiding element is one of a plurality of separate and individual wind guiding elements arranged in a row.

8. The wind deflector according to claim 7, wherein said at least one nozzle is one of a plurality of nozzles each disposed in a respective one of said plurality of wind guiding elements.

* * * * *